(12) United States Patent
Nishioka

(10) Patent No.: US 8,670,900 B2
(45) Date of Patent: Mar. 11, 2014

(54) REAR WHEEL STEERING CONTROL SYSTEM

(75) Inventor: Takashi Nishioka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 12/705,561

(22) Filed: Feb. 12, 2010

(65) Prior Publication Data

US 2010/0204888 A1 Aug. 12, 2010

(30) Foreign Application Priority Data

Feb. 10, 2009 (JP) ................................. 2009-028265

(51) Int. Cl.
*B62D 6/00* (2006.01)
*G05D 3/00* (2006.01)

(52) U.S. Cl.
USPC .................. 701/41; 701/37; 701/48; 180/444

(58) Field of Classification Search
USPC .......................... 701/41, 37, 48; 180/443, 445
See application file for complete search history.

(56) References Cited

U.S. PATENT DOCUMENTS

| | | | | |
|---|---|---|---|---|
| 4,511,160 | A * | 4/1985 | Inoue ...................... | 280/124.148 |
| 7,536,245 | B2 * | 5/2009 | Naruse et al. .................... | 701/36 |
| 7,878,512 | B2 * | 2/2011 | Horiuchi et al. ........... | 280/5.522 |
| 8,073,592 | B2 * | 12/2011 | Nishimori et al. ............... | 701/39 |
| 2004/0144167 | A1 * | 7/2004 | Halliday ........................ | 73/146 |
| 2005/0234621 | A1 * | 10/2005 | Lin et al. .......................... | 701/41 |
| 2006/0047387 | A1 * | 3/2006 | Izawa et al. ...................... | 701/37 |
| 2007/0208472 | A1 * | 9/2007 | Naruse et al. .................... | 701/37 |
| 2008/0243339 | A1 * | 10/2008 | Nishimori et al. ............... | 701/41 |
| 2009/0178876 | A1 * | 7/2009 | Miki et al. ...................... | 180/411 |
| 2010/0332083 | A1 * | 12/2010 | Yanagi et al. .................... | 701/42 |

FOREIGN PATENT DOCUMENTS

| | | | | | |
|---|---|---|---|---|---|
| JP | 63-192674 | A | | 8/1988 | |
| JP | 2-124374 | A | | 5/1990 | |
| JP | 3-243467 | A | | 10/1991 | |
| JP | 03243467 | A | * | 10/1991 | ............... B62D 5/07 |
| JP | 6-286447 | A | | 10/1994 | |
| JP | 8-099648 | A | | 4/1996 | |
| JP | 08099648 | A | * | 4/1996 | ............... B62D 6/00 |
| JP | 9-30438 | A | | 2/1997 | |
| JP | 2004-067096 | A | | 3/2004 | |
| JP | 2006-327434 | A | | 12/2006 | |
| JP | 2008-201173 | A | | 9/2008 | |

* cited by examiner

*Primary Examiner* — Patrick Cicchino
(74) *Attorney, Agent, or Firm* — Arent Fox LLP

(57) ABSTRACT

In a rear wheel steering control system for a vehicle, a rear wheel steering control unit (53) forces the toe angle of each rear wheel (3*rl*, 3*rr*) to a substantially neutral position or a slightly toe-in position when a road condition estimating unit (63) has detected a rough road surface. Thereby, when the vehicle is traveling over a rough road surface, the actuator is forced to the neutral position, and the rear wheels are brought to a neutral position so that the changes in the wheel geometry (tread and/or alignment) of the rear wheels at the time of a bump or a rebound can be avoided. Therefore, the ride quality of a vehicle equipped with the rear wheel steering control system is favorably maintained even when the vehicle is traveling over a road surface, and the rear wheels undergo large vertical displacements.

3 Claims, 5 Drawing Sheets

REAR WHEEL STEERING CONTROL SYSTEM

TECHNICAL FIELD

The present invention relates to a rear wheel steering control system that can change the toe angles of rear wheels of a vehicle.

BACKGROUND OF THE INVENTION

It has been proposed to fit a four-wheeled vehicle with a rear wheel steering control system in addition to a more conventional front wheel steering system for the purpose of improving the driving stability of the vehicle. Typically, in association with each rear wheel is provided an electric linear actuator having an output rod that can be selectively extended and retracted so that the two rear wheels may be steered individually. See Japanese patent laid open publication No. 9-030438, for instance.

The linear actuator may be advantageously incorporated into one of the lateral arms that form a part of the wheel suspension system of the corresponding rear wheel. In such a case, changing the toe angle of the rear wheel is effected by changing the length of such a lateral arm. Therefore, as the toe angle of the rear wheel is changed, the geometry of the wheel, in particular the tread of the rear wheels, changes at the times of bump and rebound, and this may adversely affect the ride quality of the vehicle.

BRIEF SUMMARY OF THE INVENTION

In view of such problems of the prior art, a primary object of the present invention is to provide a rear wheel steering control system that can improve the ride quality of a vehicle fitted with a rear wheel steering control system.

A second object of the present invention is to provide a rear wheel steering control system which is highly simple and compact in structure.

According to the present invention, such objects can be at least partly accomplished by providing a rear wheel steering control system for a vehicle, comprising; an actuator for changing a toe angle of each rear wheel; a rear wheel steering control unit for activating the actuator according to a prescribed plan; and a road condition estimating unit for estimating a state of a road surface over which the vehicle is traveling; wherein the rear wheel steering control unit forces the toe angle of each rear wheel to a substantially neutral position or a slightly toe-in position when the road condition estimating unit has detected a rough road surface.

Thereby, when the vehicle is traveling over a rough road surface, the actuator is forced to the neutral position, and the rear wheels are brought to a neutral position so that the changes in the wheel geometry (tread and/or alignment) of the rear wheels at the time of a bump or a rebound can be avoided. Therefore, the ride quality of a vehicle equipped with the rear wheel steering control system is favorably maintained even when the vehicle is traveling over a road surface, and the rear wheels undergo large vertical displacements.

According to a preferred embodiment of the present invention, the vehicle is additionally fitted with an unsprung mass control unit, and the road condition estimating unit is enabled to determine the state of road condition from a manipulated variable of the unsprung mass control unit. Thereby, the state of the road surface can be accurately determined in a simple and inexpensive manner.

According to a particularly preferred embodiment of the present invention, the unsprung mass control system forms a part of a damper control system including a variable damping force damper, and is configured to supply a control current corresponding to a product of a stroke and a stroke speed of the damper to the variable damping force damper. The variable damping force damper may consist of a telescopic damper using MRF (magneto-rheological fluid) for the working fluid thereof.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
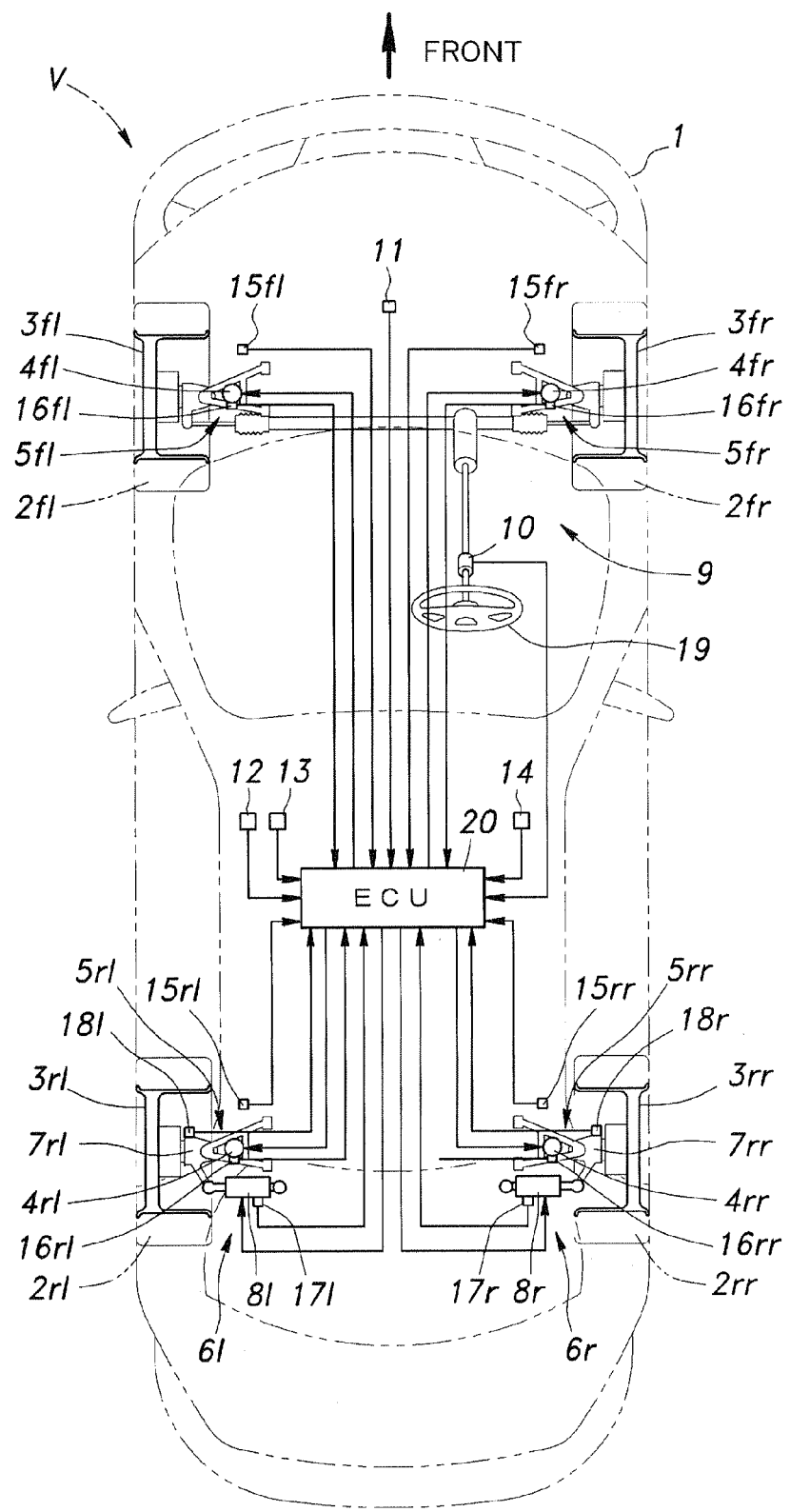
FIG. 1 is a diagram of a four-wheeled vehicle incorporated with a rear wheel steering control system embodying the present invention.

A preferred embodiment of the rear wheel steering control system of the present invention is described in the following with reference to FIG. 1. In FIG. 1, some of the components thereof are associated with each wheel, and such component parts are denoted with suffices fl, fr, rl and rr to indicate with which wheel the particular component is associated. For instance, a front left wheel is denoted with 3$fl$, a front right wheel with 3$fr$, a rear left wheel with 3$rl$ and rear right wheel with 3$rr$. When a particular component is collectively referred to, it may be denoted with the corresponding numeral without the suffix. For instance, the wheels of the vehicle may be referred to simply as 3 depending on the situation.

Referring to FIG. 1, the illustrated vehicle V has a vehicle body 1 which has four wheels 3 each fitted with a pneumatic tire 2. Each wheel 3 is rotatably supported by a knuckle 7 which is in turn supported by wheel suspension system 5 including suspension arms, a spring and a variable damping force damper 4. The variable damper 4 essentially consists of a telescopic piston and cylinder, and uses MRF (magneto-rheological fluid) for the working fluid thereof. By controlling a magnetic fluid valve incorporated in a piston of the damper 4, the damping force for the given stroke speed thereof can be changed both quickly and continuously.

The vehicle V is fitted with a front wheel steering system 9 that allows the right and left front wheels 3$fl$ and 3$fr$ to be steered by turning a steering wheel 19 with the aid of a rack and pinion gear mechanism, and a rear wheel steering control system 6 that allows each rear wheel 3$rl$, 3$rr$ to be steered individually by a corresponding electric actuator 8$l$, 8$r$ provided in association with the corresponding rear wheel. Each electric actuator 8 consists of a linear actuator that has a housing attached to a part of the vehicle body 1 and an output rod connected to the knuckle 7 and configured to extend and retract according to an electric current supplied thereto.

The rear wheel steering control system 6 allows the toe-in and toe-out of the rear wheels 3 to be changes by steering the rear wheels in a mutually symmetric relationship in a corresponding direction, and the rear wheels to be steered by a same steering angle by extending the output rod of one of the actuators and retracting the output rod of the other actuator in an opposite direction by a same stroke.

The various onboard control systems including the dampers 4 rear wheel steering control system 6 are centrally controlled by an onboard ECU (electronic control unit) 20 which essentially consists of a microcomputer incorporated with ROM, RAM, interface circuits, input and output interfaces and drivers, and is connected to various sensors (which will be described hereinafter), the dampers 4 and the electric actuators 8 via a communication line such as CAN (controlled area network).

The vehicle V is provided with a steering angle sensor 10 for detecting a steering angle of the steering wheel 19, a vehicle speed sensor 11 for detecting a traveling speed of the vehicle, a lateral G sensor 12 for detecting a lateral acceleration of the vehicle, a fore-and-aft acceleration sensor 13 for detecting a fore-and-aft acceleration of the vehicle and a yaw rate sensor 14 for detecting a yaw rate of the vehicle which are arranged in appropriate parts of the vehicle V. The vehicle V is additionally provided with a vertical G sensor 15 attached to a part of each wheel house for detecting a vertical acceleration of the corresponding part of the vehicle and a stroke sensor 16 for detecting a vertical stroke of each wheel. Each electric actuator 8 is provided with a position sensor (linear encoder) 17 for detecting the output stroke of the actuator, and the knuckle 7 of each rear wheel 3rl, 3rr carries an unsprung mass G sensor 18 for detecting the vertical acceleration of the knuckle 7 (unsprung mass acceleration).

Figure 2:
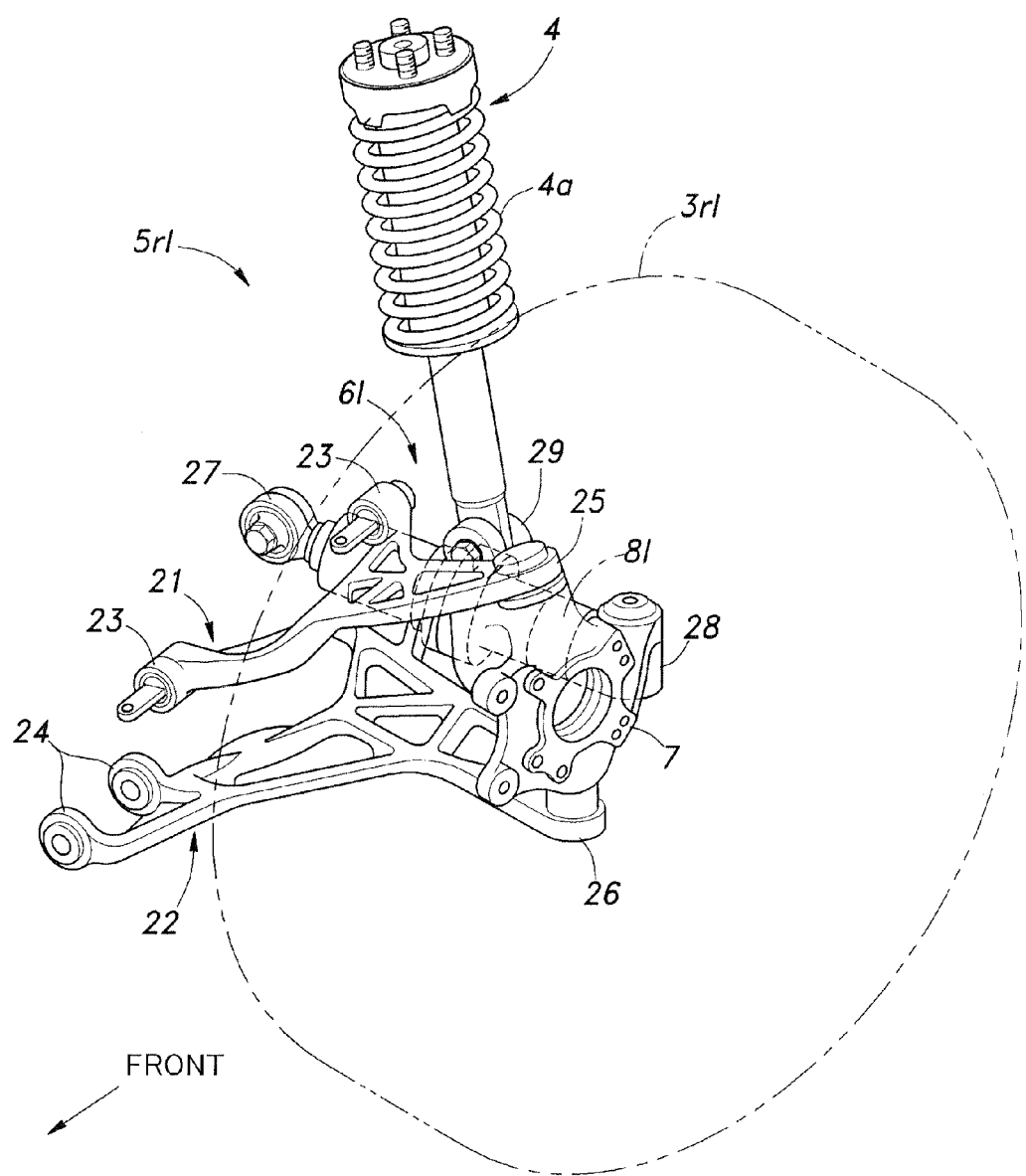
FIG. 2 is a fragmentary perspective view of a left rear wheel suspension system.

FIG. 2 is a perspective view of a left rear wheel suspension system 5rl. The right rear wheel suspension system 5rr can be given as a mirror image of the left rear wheel suspension system 5rl.

As shown in FIG. 2, this rear suspension system 5rl is of a double wishbone type, and comprises a knuckle 7 rotatably supporting the rear wheel 3rl, an upper and lower arms 21 and 22 joining the knuckle 7 to the vehicle body in a vertically moveable manner, an electric actuator 8l joining the knuckle 7 to the vehicle body so as to allow the toe angle of the rear wheel 3rl to be varied, a suspension spring 4a resiliently supporting the rear wheel to the vehicle body and a damper 5 to apply a damping force to the vertical movement of the knuckle 7.

The upper arm 21 is attached to a part of the vehicle body 1 via a rubber bush joint 23 at the base end thereof and to an upper part of the knuckle 7 via a ball joint 25, and the lower arm 22 is attached to a part of the vehicle body 1 via a rubber bush joint 24 at the base end thereof and to a lower part of the knuckle 7 via a ball joint 26. The housing of the electric actuator 8l is attached to the vehicle body 1 via a rubber bush joint 27, and the output rod of the electric actuator 8l is connected to a rear part of the knuckle 7 via a rubber bush joint 28. The damper 4 is connected to the vehicle body 1 via a rubber bush not shown in the drawings at the upper end thereof, and to an upper part of the knuckle 7 via a rubber bush joint 29 at the lower end thereof.

Thus, when the output rod of the electric actuator 8l is extended, the rear part of the knuckle 7 moves laterally outward so that a toe-in movement of the rear wheel 3rl is effected. Conversely, when the output rod of the electric actuator 8l is retracted, the rear part of the knuckle 7 moves laterally inward so that a toe-out movement of the rear wheel 3rl is effected.

Figure 3:
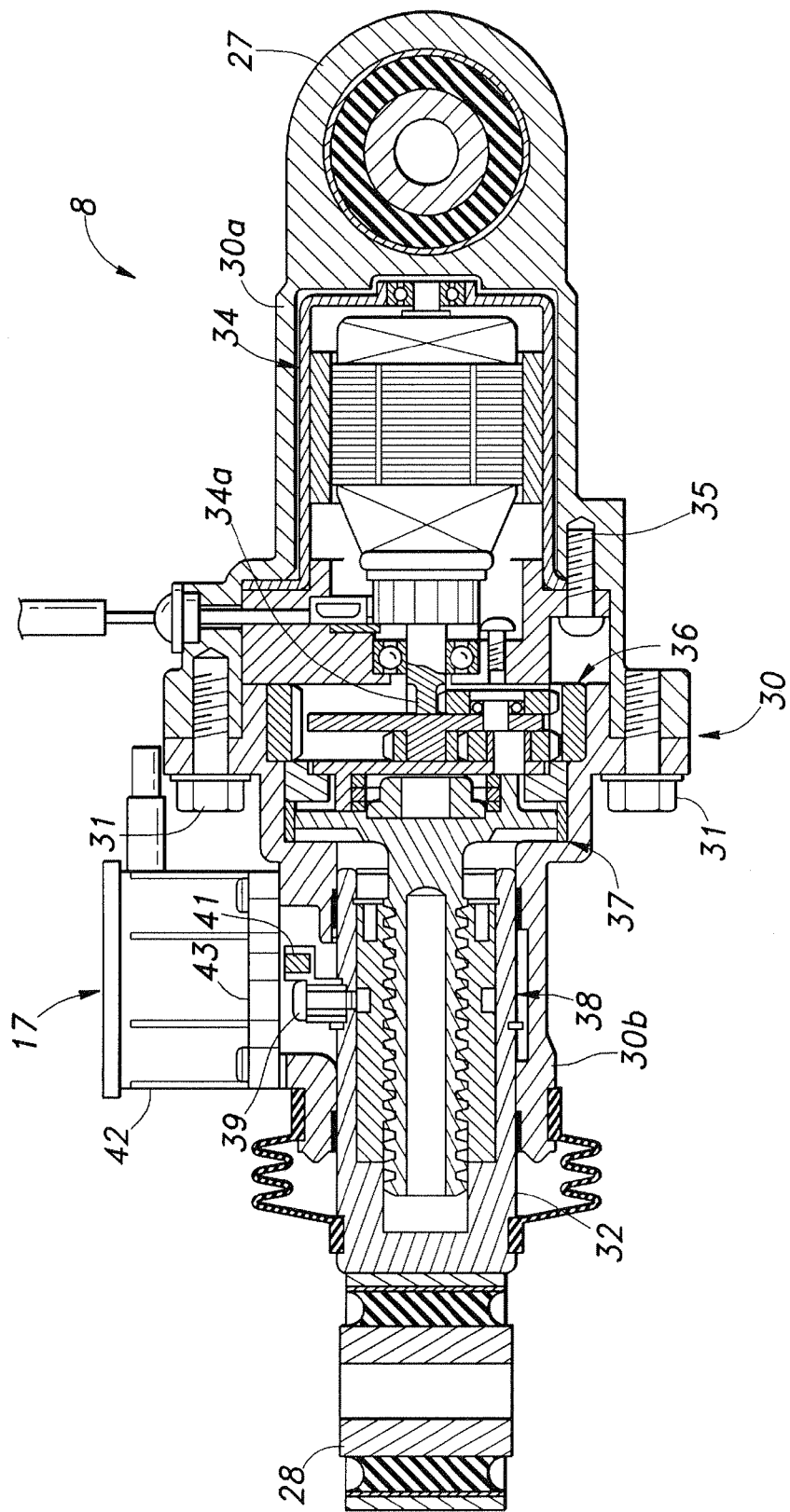
FIG. 3 is a vertical sectional view of a linear electric actuator of the rear wheel steering control system.

FIG. 3 is a vertical sectional view of the electric actuator 8l of the illustrated embodiment. As shown in FIG. 3, the electric actuator 8l comprises a first housing 30a integrally formed with the rubber bush joint (vehicle body) 27, a second housing 30b connected to the first housing 27 by a plurality of threaded bolts 31 and forming a whole housing 30 jointly with the first housing 20a and an output rod 32 extending out of the second housing 30b and having the rubber bush joint (knuckle) 28 formed at the free end thereof. The first housing 30a receives therein a brushless DC motor 34 serving as a power source and fixedly attached to the first housing 30a by using threaded bolts 35. The second housing 30b receives therein a planetary gear type reduction gear unit 36, an elastic coupling 37 and a feed screw mechanism 38 using a trapezoidal thread.

When the DC motor 34 is actuated, the rotation of the output shaft 34a thereof is reduced in speed by the reduction gear unit 36, and is then converted into a linear motion of the output rod 32 by the feed screw mechanism 38.

The position sensor 17 provided on the outer periphery of the second housing 30b essentially consists of a magnet piece 41 fixedly attached to the output rod 32 by a threaded bolt 39 and a differential transformer 43 received in a sensor housing 42 which is in turn attached to the second housing 30b so as to oppose the magnet piece 41. The differential transformer 43 includes a primary winding and a pair of secondary windings, and a differential voltage produced between the secondary windings provides a measure of a linear displacement of the output rod 32.

Figure 4:
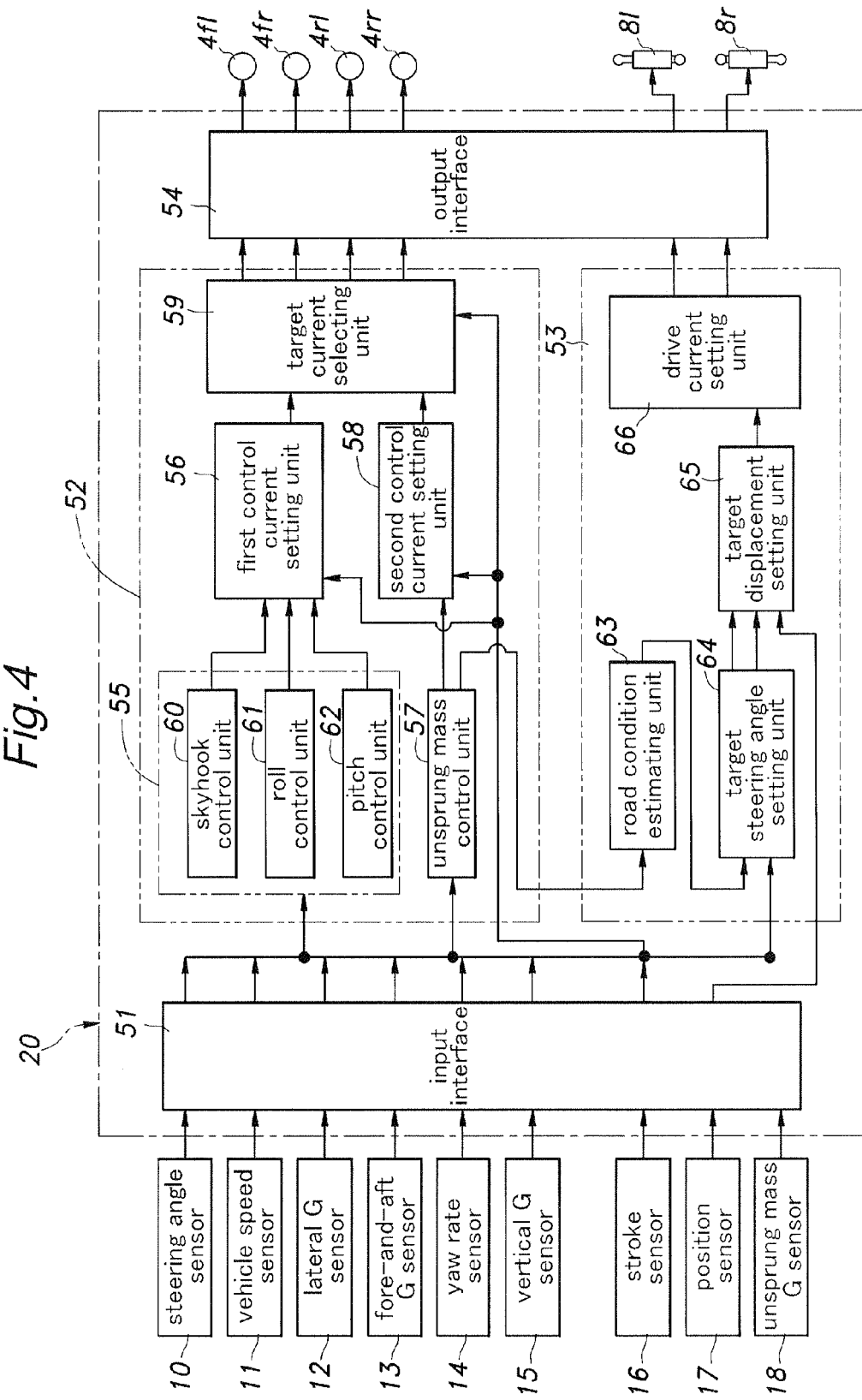
FIG. 4 is a block diagram of an essential part of an ECU used in the rear wheel steering control system.

FIG. 4 is a block diagram of an essential part of the ECU 20 used in the illustrated embodiment. The ECU 20 includes a damping force control unit 52 for controlling the damping action of the dampers 4, a rear wheel steering control unit 53 for controlling the steering action of the electric actuators 8, an input interface 51 interfacing the various sensors 10-18 with the damping force control unit 52 and rear wheel steering control unit 53, and an output interface 54 interfacing the damping force control unit 52 and rear wheel steering control unit 53 with the respective actuators.

The damping force control unit 52 comprises an attitude control unit 55, a first control current setting unit 56, an unsprung mass control unit 57, a second control current setting unit 58 and a target current selecting unit 59. The attitude control unit 55 comprises a skyhook control unit 60, a roll control unit 61 and a pitch control unit 62 which produce a skyhook control target value Dsh, a roll control target value Dr and a pitch control target value Dp, respectively, according to the detection signals of the various sensors 10-16. The first control current setting unit 56 selects one of the three control target values Dsh, Dr and Dp which is the same in sign as the stroke speed of the damper 4 and largest in absolute value as the first target damping force Dtgt1, and looks up a first control current Itb1 from a prescribed first control current map for the given first target damping force Dtgt1 and stroke speed obtained from the stroke sensor 16.

The unsprung mass control unit 57 computes an unsprung mass control target value Dw for each damper 4 according to the vehicle speed obtained from the vehicle speed sensor 11 and stroke position obtained from the stroke sensor 16. The second control current setting unit 58 sets the unsprung mass control target value Dw as the second target damping force Dtgt2, and looks up a second control current Itb2 from a prescribed second control current map for the given second target damping force Dtgt2 and stroke speed obtained from the stroke sensor 16.

The skyhook control unit 60 is configured to control the oscillation of the sprung mass, and is effective in suppressing the resonant oscillation of the sprung mass which is about 1 Hz, but is relatively ineffective in suppressing the resonant oscillation of the unsprung mass which is about 10 Hz. In the unsprung mass control, when the damper stroke and stroke speed are high, an unsprung mass control current computed by multiplying a prescribed constant, the damper stroke speed and damper stroke is used instead of the skyhook control current (or added to the target current value required by the skyhook control) to provide the final target current for the damper. As a result, independently of the skyhook control, the resonant oscillation of the unsprung mass in a frequency range around 10 Hz can be effectively suppressed. For more details of the unsprung mass control, reference may be made to Japanese patent laid open publication No. 2006-321259, and U.S. Pat. No. 7,406,371.

The target current selecting unit 59 compares the obtained first control current Itb1 and second control current Itb2 with each other, and sets one of them having a greater absolute value as the target current Itgt, and supplies a drive current corresponding to the target current Itgt to the magnetic fluid valve of each damper 4 so that a desired damping control may be accomplished.

The rear wheel steering control unit 53 comprises a road condition estimating unit 63, a target steering angle setting unit 64, a target displacement setting unit 65 and a drive current setting unit 66. The road condition estimating unit 63 estimates the state of the road surface on which the vehicle is traveling according to the unsprung mass control target value Dw computed by the unsprung mass control unit 57, and forwards the estimated state of the road surface to the target steering angle setting unit 64. The target steering angle setting unit 64 then determines a rear wheel target steering angle according to the detection signals of the steering angle sensor 10 and yaw rate sensor 14 and the estimated state of the road surface. The target displacement setting unit 65 determines a target displacement of the electric actuator 8 according to the difference between the target rear wheel steering angle and actual rear wheel steering angle obtained from the output of the position sensor 17. The drive current setting unit 66 supplies a drive current for the electric actuator 8 according to the target displacement.

The mode of operation of the illustrated embodiment is described in the following. When the operation of the vehicle V has started, the ECU 20 executes the damping force control and a rear wheel steering control at a prescribed control interval (2 ms, for instance).

The damping control is executed by the damping force control unit 52. Upon determining the operating condition of the vehicle according to the detection signals of the various sensors 10-16, the damping force control unit 52 computes a skyhook control target value Dsh, a roll control target value Dr and a pitch control target value Dp for each wheel according to the determined operating condition of the vehicle V. The first control current setting unit 56 selects one of these target values which has the same sign as the stroke speed of the damper and the largest absolute value as a first target damping force Dtgt1, and looks up a first target current map to determine a first control current Itb1 according to the first target damping force Dtgt1 and the stroke speed of the damper 4. The unsprung mass control unit 57 computes an unsprung mass control target value Dw according to the vehicle speed and stroke position of the damper 4. The second control current setting unit 58 then sets the unsprung mass control target value Dw as a second target damping force Dtgt2, and looks up a second target current map to determine a second control current Itb2 according to the second target damping force Dtgt2 and the stroke speed of the damper 4. The target current selecting unit 59 selects one of the first target damping force Dtgt1 and second target damping force Dtgt2 which is greater in absolute value as a target current Itgt which is supplied to the damper 4 for controlling the damping force thereof.

The rear wheel steering control of the illustrated embodiment is described in the following with reference to the flowchart of FIG. 5. The rear wheel steering control is performed on each of the rear wheels 3rr and 3rl in a similar manner, and the following description is limited to that for the left rear wheel 3rl for the convenience of description.

Figure 5:
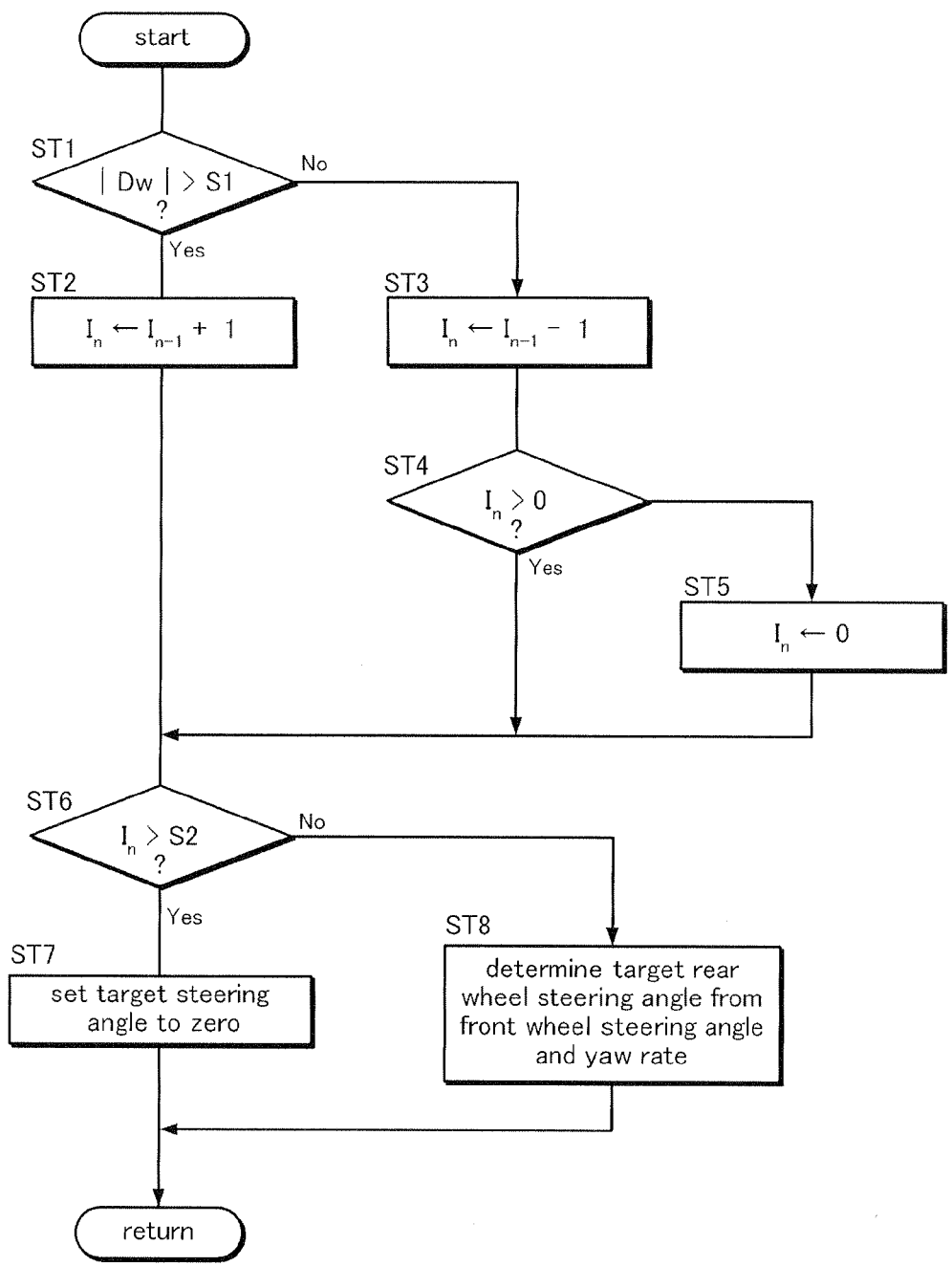
FIG. 5 is a flowchart showing the rear wheel steering control process of the illustrated embodiment.

The ECU 20 executes the rear wheel steering control illustrated in the flowchart of FIG. 5 concurrently with the damping control described above. The road condition estimating unit 63 determines if the absolute value of the unsprung mass control target value Dw forwarded from the unsprung mass control unit 57 at a regular control interval is greater than a prescribed threshold value S1 in step ST1. If the determination result is Yes, a current cumulative value $I_n$ is computed by adding "1" to the previous cumulative value $I_{n-1}$ in step ST2. If the determination result is No, the current cumulative value $I_n$ is computed by subtracting "1" from the previous cumulative value $I_{n-1}$ in step ST3. In the latter case, it is determined if the current cumulative value $I_n$ is smaller than zero in step ST4. If it is the case, the current cumulative value $I_n$ is set to zero in step ST5. Thus, the minimum value of the current cumulative value $I_n$ is zero owing to the process executed in steps ST4 and ST5.

Following steps ST2, ST4 or ST5, the road condition estimating unit 63 determines if the current cumulative value $I_n$ is greater than a second threshold value S2 in step ST6. If the determination result of this step is Yes or if the vehicle V is traveling over a rough road surface, the absolute value of unsprung mass control target value |Dw| increases owing to the need to control the vibration of the unsprung mass. Therefore, the state of the road surface can be evaluated by determining if the current cumulative value $I_n$ has exceeded the second threshold value S2. The determination result of the road condition estimating unit 63 is forwarded to the estimated road surface signal to the target steering angle setting unit 64.

When the estimated road surface signal indicates a rough road surface, the target steering angle setting unit 64 set the rear wheel target steering angle to zero in step ST7. Each actuator 8 is configured such that the rear wheel steering angle is zero when the actuator is in a neutral state without being extended or retracted. The target displacement setting unit 65 and a drive current setting unit 66 control each electric actuator 8 so that the rear steering angle is maintained at zero. As a result, when the vehicle is traveling over a rough a rough road surface, each electric actuator 8 is maintained in a neutral position so that the impairment of the ride quality which may be otherwise caused by the changes in the tread of the vehicle at the time bump and rebound conditions owing to the extension or retraction of the electric actuator 8 may be avoided.

When the estimated road surface signal does not indicate a rough road surface, the rear wheel target steering angle is set in a normal way according to the detection signals of the steering angle sensor 10 and yaw rate sensor 14 in step ST8. The target displacement setting unit 65 and a drive current setting unit 66 control each electric actuator 8 so that the actual rear wheel steering angle agrees with the target rear wheel steering angle. When the vehicle is not traveling over a rough road surface, extending or retracting the electric actuator 8 does not cause changes in the tread at the time of bump or rebound, and the actuation of the electric actuator 8 does not impair the ride quality.

As a slightly modified embodiment of the present invention, the rear wheel target steering angle may be set to a slightly toe-in angle by extending the electric actuator 8. By forcing the rear wheel target steering angle to a slightly toe-in angle from a normally controlled value, the changes in the tread at the time of the bump and rebound can be controlled, and the ride quality of the vehicle is prevented from being impaired.

Although the present invention has been described in terms of preferred embodiments thereof, it is obvious to a person skilled in the art that various alterations and modifications are possible without departing from the scope of the present invention which is set forth in the appended claims. For instance, the state of the road surface was estimated from the unsprung mass target value Dw in the foregoing embodiment, but may also be estimated from other data such as the detection signal of the vertical G sensor 15 and image information obtained by a camera.

The contents of the original Japanese patent application on which the Paris Convention priority claim is made for the present application, as well as the contents of any publications mentioned in this disclosure, are incorporated in this application by reference.

The invention claimed is:

1. A rear wheel steering control system for a vehicle, comprising:

a knuckle connected to a vehicle body by an upper arm and a lower arm and supporting each rear wheel;

an actuator connected between a part of a vehicle body and a rear part of the knuckle, and having an output rod configured to be extended and retracted for changing a toe angle of the rear wheel, wherein the output rod is extended when a toe-in movement of the rear wheel is effected;

a rear wheel steering control unit for activating the actuator according to a prescribed plan; and a road condition estimating unit for estimating a state of a road surface over which the vehicle is traveling;

wherein the rear wheel steering control unit forces the toe angle of each rear wheel to a slightly toe-in position when the road condition estimating unit has detected a rough road surface.

2. The rear wheel steering control system according to claim 1, further comprising an unsprung mass control unit, wherein the road condition estimating unit determines the state of road condition from a manipulated variable of the unsprung mass control unit.

3. The rear wheel steering control system according to claim 2, wherein the unsprung mass control system forms a part of a damper control system including a variable damping force damper, and is configured to supply a control current corresponding to a product of a stroke and a stroke speed of the damper to the variable damping force damper.

* * * * *